Figure 1:
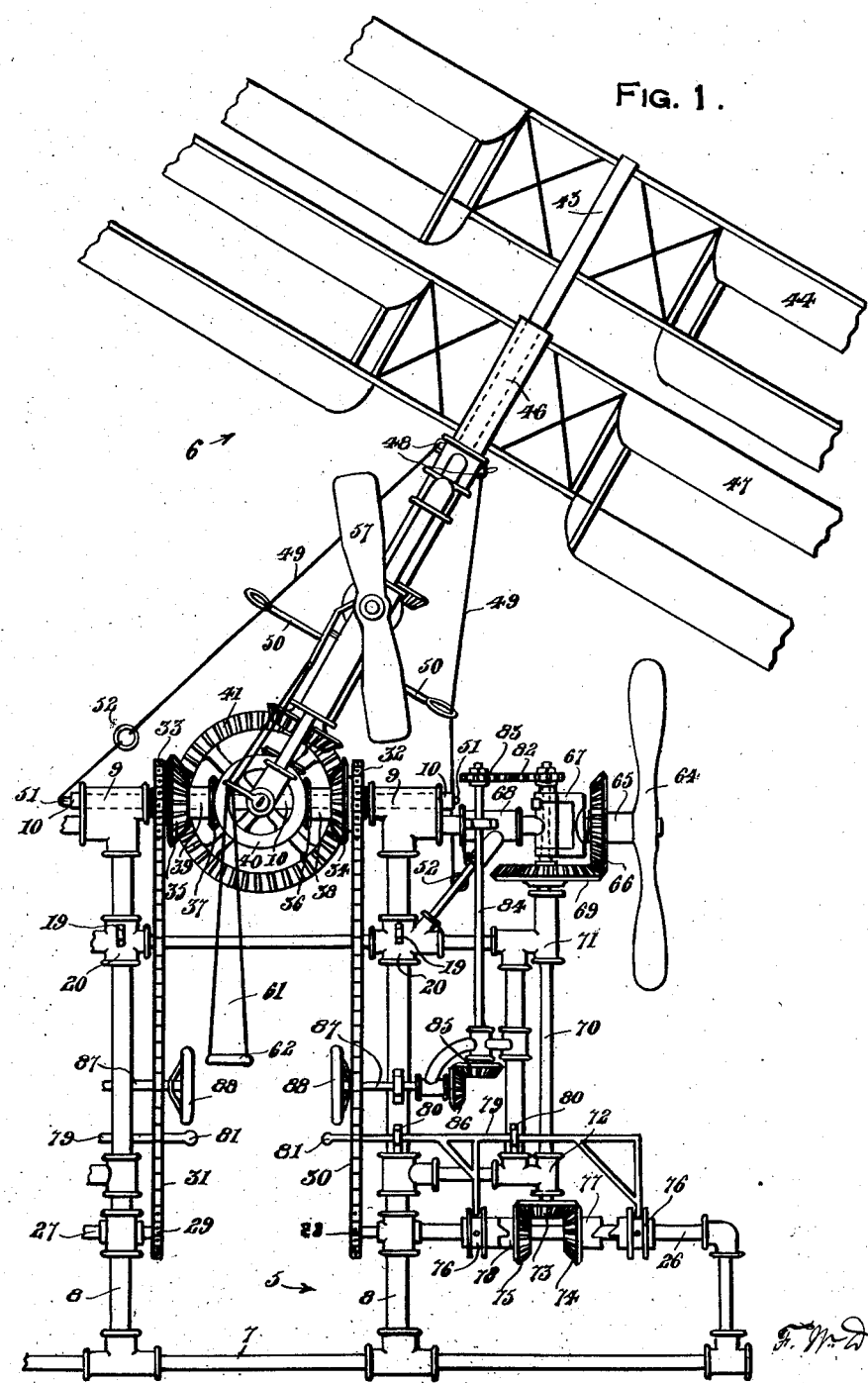

Jan. 5, 1926.

F. W. DUFWA 1,568,887

MEANS FOR MAINTAINING THE EQUILIBRIUM OF FLYING MACHINES

Filed July 16, 1925   2 Sheets-Sheet 1

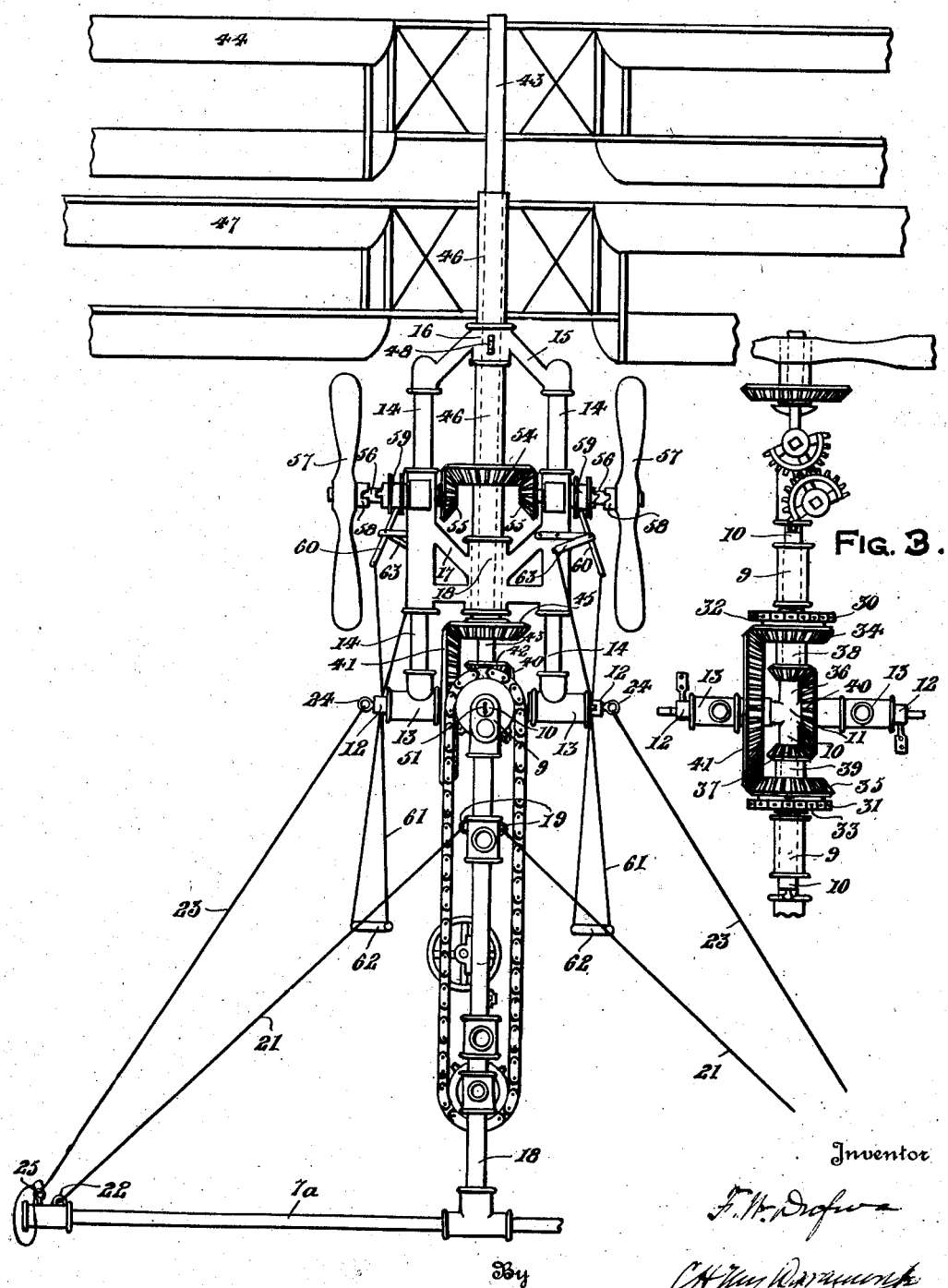

Patented Jan. 5, 1926.

1,568,887

UNITED STATES PATENT OFFICE.

FREDERICK WILLIAM DUFWA, OF MEXICO, MEXICO.

MEANS FOR MAINTAINING THE EQUILIBRIUM OF FLYING MACHINES.

Application filed July 16, 1925. Serial No. 44,003.

*To all whom it may concern:*

Be it known that I, FREDERICK WILLIAM DUFWA, a citizen of Sweden, residing at Mexico city, Mexico, have invented certain new and useful Improvements in Means for Maintaining the Equilibrium of Flying Machines, of which the following is a specification.

This invention relates to certain new and useful improvements in means for maintaining the equilibrium of flying machines of the type generally termed helicopters.

The primary object of this invention is to establish a stable equilibrium of flying machines of the type that are constructed to rise vertically from the ground, such as helicopters or the like.

Other objects and advantages of the invention will be apparent during the course of the following description.

In the accompanying drawings forming a part of this specification and in which like numerals are employed to designate like parts throughout the same, Figure 1 represents a side elevational view of a helicopter embodying this invention, with the helicopter section in inclination to show the working of the lines 49, Figure 2 represents an end elevational view of the central portion of the machine shown in Figure 1, and Figure 3 represents a top plan view of the cross axles and all parts mounted thereon with the upper and lower frameworks of the machine removed.

When trying to construct a flying machine that will rise vertically from the ground and come down in the same way, we must first of all liberate ourselves from the tradition of the aeroplane. One kind of helicopter, which has hitherto been constructed with one or two propellers or screws rotating on a vertical axle to lift them, have been nothing but aeroplanes, whose wings and tails were cut off and the machine then placed on end to make it start upward. These machines, however, never could balance themselves in the air and they would all turn over and fall. The reason for this conduct lies in their stiff construction.

This stiff construction makes it possible for the lifting forces to diminish greatly or annul entirely the balancing effect that gravity should exercise on the machine. In these stiff machines gravity is therefore nothing but an enemy which destroys the machine as soon as the lifting forces fail, but gravity can be transformed into a friend which balances the machine automatically and, when the lifting forces fail, makes it come down like a parachute. With the stiff frame gravity cannot act in this way and it is therefore necessary to give it freedom to act with its full strength by using a flexible frame. This is done by making the vertical helicopter axle flexible in all directions in one place at a suitable distance below the helicopter propellers and making this place the union between the upper framework, where the helicopter propellers are mounted, and the car, where the motor, aviator, and all heavy parts are located. The transmission of power from the driving motors to the lifting propellers must not, of course, in the least stiffen this universal connection or joint.

The flexibility of the helicopter axle makes the machine act like a parachute both when it goes up and when it comes down. The car always hangs vertical and pulls downwardly at the lower end of the helicopter axle, thus automatically counteracting any tendency of the device to deviate from its vertical position. If the machine is left free to obey the impulses it receives from the outside by changes in the air pressure, it will hang vertical like a parachute and drift according to the impulses received, instead of trying to turn over. If the motor or motors stop, it will go down very much like a parachute, if the helicopter or lifting propellers are of the right size and construction.

When we try, by means of the steering apparatus, to make the machine go in another direction than that of the wind, our difficulties commence and they increase the more we try to oppose the wind. In spite of the automatic resistance, the upper part of the machine will bend over more or less and to prevent this from going too far, we must connect one of the upper vertical shifting propellers to the source of power in order to maintain the equilibrium and force the machine in the desired direction, always remembering, that if the outside resistance becomes too great and the machine threatens to get out of control, we can instantly restore its equilibrium by letting it loose from all restraint which means stopping the auxiliary propellers and letting the steering apparatus loose. Even the motor or motors can be stopped and the machine entirely transformed into a parachute.

It is to be understood that the specific design of the lifting propellers is not shown nor described in this application for any suitable type or types may be used without departing from the spirit and scope of the invention as claimed. No control car or compartment has been shown, however, it is to be understood that such a car or compartment should be provided and equipped with wheels, or the like and everything that is necessary for the convenience of the aviators. Neither is the source of power illustrated or described, but it is intended that two motors should be used, one for each half of the machine, so that if one stops the helicopter can travel on with only the other working.

In the drawings, wherein for the purposes of illustration is shown a preferred embodiment of this invention, the numeral 5 designates in its entirety the body portion or main frame of the machine which has connected thereto in a manner to permit relative universal movement in respect thereof the helicopter or pulling section which is designated in its entirety by the reference numeral 6.

The main part, body portion or frame 5 includes the horizontal bar 7 which has rigidly connected thereto the uprights or standards 8. The upper ends of these uprights or standards 8 have rigidly connected thereto the connectors or bearings 9 which receive the opposite ends of the shaft 10. This shaft 10 is illustrated in Fig. 3 as being connected at its longitudinal center 11 to the right angularly arranged shaft 12. Swiveled upon the opposite ends of the axle 12 are the bearings 13 which have rigidly fastened thereto the uprights 14. The upper ends of these uprights 14 have an inverted V-shaped bracket 15 fastened thereto which is provided with a central bearing 16. Intermediate the ends of the uprights 14 is arranged a bracket or frame 17 which has the central bearing portion 18 formed therein in axial alinement with bearing portion 16. The elements so far described constitute the main skeleton or structure of the machine and provide the universal connection between the body portion or main frame and the helicopter or pulling section. In Fig. 2 eyelets 19 are shown fastened to the frame connectors 20 and have fastened thereto the brace or guy cables 21 which extend to eyelets 22 carried by the bottom or main frame bar 7ª. These brace or guy wires 21 and other similar wires, not shown, are provided for reinforcing and stiffening the main body portion or frame 5.

In Fig. 1, two drive shafts 26 and 27 are illustrated and are intended to be driven in opposite directions by two independent motors, the motors and their connections with the shafts 26 and 27 being omitted. The adjacent ends of these shafts 26 and 27 are provided with sprocket wheels 28 and 29 respectively upon which ride the sprocket chains 30 and 31 respectively. These sprocket chains further ride on sprocket wheels 32 and 33 which are loosely mounted upon the shaft 10 and have formed integrally therewith the bevel pinions 34 and 35 of equal size and the additional bevel pinions 36 and 37 of equal size, but smaller in diameter than the bevel pinions 34 and 35. In Figs. 1 and 3 the pinions 34 and 36 are illustrated as being connected by the hub 38 while the pinions 35 and 37 are illustrated as being connected by the hub 39. It is of course understood that these bevel pinions, their hubs, and their driving sprocket wheels 32 and 33 are all loose on the shaft 10. The smaller bevel pinions 36 and 37 are shown in Figs. 1 and 3 as meshing with diametrically opposite sides of the bevel gear 40 which is loose on the shaft 12. The remaining bevel pinions 34 and 35 are shown as meshing with diametrically opposite sides of the bevel gear 41 which is loosely mounted on the opposite end portion of the shaft 12.

In Figs. 1 and 2 the bevel gear 40 is illustrated as meshing with a pinion 42 fastened to the shaft 43 which extends perpendicularly through the bearings 16 and 18 to have mounted upon its upper end one set of helicopter or pulling propellers 44. The bevel gear 41 is illustrated as meshing with the bevel pinion 45 that is rigidly mounted upon the lower end of the tubular shaft 46 which surrounds the shaft 43 and is also received within the bearings 16 and 18. This tubular shaft 46 has mounted upon its upper end the second set of helicopter or pulling propellers 47 which is arranged below the first mentioned set 44.

It will now be seen that the sets of helicopter or pulling propellers 44 and 47 may be driven in opposite directions by the connections between the drive shafts 26 and 27 and their supporting shafts 43 and 46 and that the particular gearing just described will permit these propellers to be driven irrespective of the angularity of the helicopter or pulling section 6 in respect to the body portion or main frame 5. Two different degrees of angularity are shown in Figs. 1 and 2.

For the purpose of steadying the helicopter or pulling sections 6 in respect to the body portion or main frame 5 in taking off or in leaving the ground, the bearing 16 has fastened thereto the eyelets 48 having connected thereto the guy wires 49 which extend down through guides 50 and are connected to the opposite ends of the shaft 10, as at 51. Each one of these wires 49 has a ring 52 connected thereto which is intended to be slipped over the element 51 to which the said wire is fastened at its lower end. After the machine has left the ground, the rings 52 should be disconnected from the elements 51, as shown in Fig. 1, so that the helicopter or pulling section 6 may pivot in respect to the body portion or main frame 5. In the same way in Fig. 2 the wires 23 are provided with these rings 52 which are put over the hooks 25 in order to hold the frames 5 and 6 stiff on the ground, while during flight they are to be taken off the hooks.

In order to partially control the pivoting of the helicopter or pulling section 6 in respect to the body portion or main frame 5 and further to provide means for driving the machine horizontally after the desired elevation has been reached, the tubular shaft 46 has fastened thereon a bevel gear 54 having meshing with diametrically opposite sides thereof the bevel pinions 55 which are mounted on the shafts 56. These shafts 56 have loosely mounted thereon the propellers 57, the hub portions of which are formed into clutch parts 58 which cooperate with the clutch members 59 splined on the shafts 56. To control the connection of the propellers 57 with the shafts 56, the collars 59 with their complemental clutch portions are shifted longitudinally of the shafts 56 by means of the levers 60 which have connected to their free ends the wires or cables 61 that extend downwardly to the weights or rings 62 and then upwardly to the arms 63. By pulling on either of the cables or cords 61, the propellers 57 may be connected or disconnected with the source of power as desired.

In Fig. 1 there is shown a horizontal drive propeller 64 which is carried by the shaft 65 having the bevel gears 66 fastened thereto. This shaft 65 is supported by the bracket 67 journaled on the frame part 68 carried by the connector 9 and is permitted to swing horizontally. The bevel gear 66 meshes with a bevel gear 69 carried by the perpendicular shaft 70 which is journaled in the frame parts 71 and 72. The lower end of this shaft 70 has fastened thereto the bevel gear 73 which has meshing with diametrically opposite sides thereof the bevel gears 74 and 75 that are loosely mounted upon the drive shaft 26.

Splined to this drive shaft 26 are the clutch elements 76 which are intended to cooperate with the clutch portions 77 and 78 of the bevel gears 74 and 75. These clutch elements 76 are connected by a control mechanism or rod 79 which is slidably carried by the bearings 80 and is formed with an operating end or handle 81. It will now be seen that by sliding this member 79 in its bearings or guides 80, the respective clutch elements 76 may be thrown into and out of engagement with the clutch portions 77 and 78 of the bevel gears 74 and 75 for connecting either of the bevel gears to the drive shaft 26, or leaving both free.

For the purpose of permitting the propeller 64 to be moved through a horizontal plane to steer the machine for changing the direction of travel of the same horizontally through the air, the bracket member 67 carrying the shaft 65 has fastened thereto a sector 82 which meshes with a similar sector 83 carried by the perpendicular shaft 84. The lower end of the shaft 84 has mounted thereon a bevel gear 85 which meshes with a similar gear 86 carried by the steering shaft 87. This shaft has mounted thereon a steering wheel 88 by means of which the mechanism just described may be operated in opposite directions for shifting the said propeller 64 and its shaft 65. It will be understood that the remaining upright 8 of the body portion or main frame 5 is provided with a driving and steering propeller similar to the propeller designated by the reference numeral 64. The only parts of this second steering and driving mechanism which are illustrated are the steering wheel 88, its steering shaft 87, and the clutch control member 79 and its handle 81.

It is to be understood that all details of construction such as bearings of the antifriction type to prevent wear and reduce friction, have been omitted and in this respect the showing of this machine may be considered as diagrammatic. It is further to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In a machine of the type described, two right-angularly arranged shafts rigidly joined at their centers, a lifting structure pivotally connected to one shaft, a pendant structure pivotally connected to the second shaft, a vertical shaft journaled in the lifting structure, a drive shaft journaled in the pendant structure, meshing bevel gears loose on the right-angularly arranged shafts, a bevel gear on the vertical shaft meshing with one of the loose bevel gears, and means for operatively connecting the drive shaft with the other of the loose bevel gears.

2. In a machine of the type described, two right-angularly arranged shafts rigidly joined at their centers, a lifting structure pivotally connected to one shaft, a pendant structure pivotally connected to the second shaft, a vertical shaft journaled in the lifting structure, a drive shaft journaled in the pendant structure, meshing bevel gears loose on the right-angularly arranged shafts, a bevel gear on the vertical shaft meshing with one of the loose bevel gears, means for operatively connecting the drive shaft with the other of the loose bevel gears, a horizontally swinging steering propeller carried by the pendant structure, means for selectively connecting the steering propeller to the drive shaft to cause the steering propeller to rotate in opposite directions, and means for swinging the steering propeller in opposite directions.

3. In a machine of the type described, two right angularly arranged shafts rigidly joined at their centers, a lifting structure pivotally connected to one shaft, a pendant structure pivotally connected to the second shaft, a vertical shaft journaled in the lifting structure, a drive shaft journaled in the pendant structure, meshing bevel gears loose on the right-angularly arranged shafts, a bevel gear on the vertical shaft meshing with one of the loose bevel gears, a horizontally swinging steering propeller carried by the pendant structure, means for selectively connecting the steering propeller to the drive shaft to cause the steering propeller to rotate in opposite directions, means for swinging the steering propeller in opposite directions, a vertical driving propeller carried by the lifting structure, power transmission means between the driving propeller and the vertical shaft, and means for rendering said power transmission means operative or inoperative as desired.

In testimony whereof I affix my signature.

FREDERICK WILLIAM DUFWA.